Figure 1:
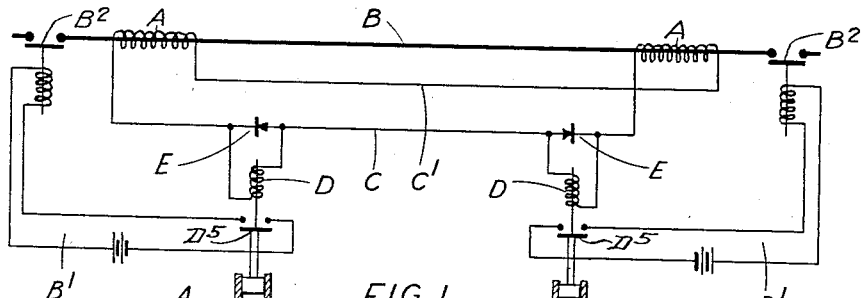

Oct. 28, 1930.  J. R. BEARD  1,779,724
ELECTRIC PROTECTIVE ARRANGEMENT FOR A. C. POWER CIRCUITS
Filed April 16, 1928  2 Sheets-Sheet 1

Patented Oct. 28, 1930

1,779,724

UNITED STATES PATENT OFFICE

JAMES ROBERT BEARD, OF LONDON, ENGLAND, ASSIGNOR TO ELECTRICAL IMPROVEMENTS LIMITED, OF NEWCASTLE-UPON-TYNE, ENGLAND, A COMPANY OF GREAT BRITAIN

ELECTRIC PROTECTIVE ARRANGEMENT FOR A. C. POWER CIRCUITS

Application filed April 16, 1928, Serial No. 270,414, and in Great Britain April 28, 1927.

This invention relates to an electric protective arrangement for A. C. power circuits of the kind employing pilot circuits so arranged that want of balance between the incoming and outgoing currents at the ends of the protected section causes the disconnection of that section from the rest of the system. In such protective arrangements it is usual to employ at the ends of the protected section current transformers whose secondaries are connected in the pilot circuit. In the form most commonly employed in practice the secondary E. M. F.'s are normally balanced against one another in the pilot circuit, but when a fault occurs in the protected section this balance is disturbed and relays in the pilot circuit are operated to cut out the section at its ends.

In the practical employment of such balanced protective arrangements a number of difficulties arise.

(a) The greatest of these is the high cost of the large heavily insulated pilot wires which are usually about 0.005 square inch section. These pilot wires are usually provided in the form of a multi-core lead-covered cable.

(b) A lead-covered cable is also desirable where the pilot wires are to be used for protecting overhead lines as the relays might otherwise operate through currents induced in the pilot circuits by faults on the high voltage system, but the cost of supporting cable with such large conductors on the overhead lines is very high.

(c) Unless special precautions are taken there is always the possibility that a healthy feeder may be unnecessarily disconnected when a heavy straight-through current is flowing to a fault elsewhere. This straight-through current produces comparatively high voltages on the secondaries of the current transformers at the two ends and although these may balance each other exactly so that there is no through circulating current in the pilot circuit yet the capacity currents flowing in the pilot circuit may be sufficiently large in themselves to operate the relays.

(d) There is a risk of undesired operation of the relays as the result of high frequency surges passing through the protected section on the occurrence of a fault external to the section.

The present invention has for its object to provide an improved protective arrangement of the above general kind in which some or all of these disadvantages are wholly or largely eliminated.

This is accomplished by the use of rectifiers in connection with the relay and pilot circuits in such a manner that the protective system will operate with D. C. relays instead of A. C. relays as hitherto employed. It is a well-known fact that D. C. relays can be made many times more sensitive than A. C. relays.

The high cost of the pilot cables is partly due to the large size of conductor and partly to the large amount of insulation. The minimum resistance of conductors and the minimum voltage for which they can be insulated are both directly dependent on the maximum sensitivity for which suitable relays can be constructed, and it is therefore evident that a protective system according to this invention employing D. C. relays will be of particular advantage in removing or minimizing the above mentioned difficulties (a) and (b). Various proposals have already been made with the object of overcoming difficulties (c) and (d), but those difficulties also are to some extent removed by the improved system.

The rectifiers may be associated with the D. C. relays so as to cause unidirectional currents to flow through the relays when alternating currents are flowing in the pilot circuit. Thus each relay may be shunted by a rectifier whereby one half of the A. C. wave will pass without going through the relay whilst the other half is forced through the relay. Both halves of the wave may be utilized by employing a two-coil relay and two rectifiers.

Alternatively the rectifiers may be associated with the current transformers so that they act to convert the secondary E. M. F.'s into unidirectional E. M. F.'s which are applied to the pilot circuit and the relays, the rectifiers preferably being arranged to give full-wave rectification.

In another arrangement each relay has two coils which are connected together on one side to a current transformer secondary whilst on the other side they are connected to the corresponding coils of the relay at the remote end through two pilot wires each containing a rectifier, the arrangement being such that unidirectional currents can flow in one direction through one coil of each relay and in the other direction through the other coil.

The invention may be carried into practice in various ways but eight convenient alternative arrangements thereto are illustrated by way of example respectively in the eight figures of the accompanying drawings in which Figure 1 is a wiring diagram illustrating one embodiment of the present invention, and Figures 2 to 8 inclusive are diagrams illustrating alternative arrangements and modifications of the circuits illustrated in Figure 1.

In the arrangement of Figure 1 the invention is applied to a simple Merz-Price protective system of the opposed E. M. F. type, in which the secondaries A of current transformers at the ends of the protected section B are connected together by pilot wires C $C^1$ in such a manner that there is normally a balance of E. M. F.'s in the pilot circuit. In series with the pilot circuit at each end is a D. C. relay D shunted by a rectifier E, the normally opened contact $D^5$ of the relay D controlling a tripping circuit $B^1$ for a circuit-breaker $B^2$ in the protected section. With this arrangement the occurrence of a fault in the protected section disturbs the normal balance in the pilot circuit and causes an alternating current to flow therein. Each rectifier acts to allow one half of the alternating wave to flow through it without affecting the relay and to force the other half of the wave to flow through the relay. The combination of rectifier and D. C. relay may thus be regarded as replacing the usual A. C. relay, and indeed the general method of operation of the protective gear is practically identical with what it would be if by some means a more sensitive A. C. relay had been designed.

In Figure 1 the main protected section is shown as a single conductor, but it will be appreciated that the arrangement can be applied to the protection of a group of conductors, such for example as a three-phase feeder, whether a two-core or a three-core pilot circuit is employed.

Figure 2:
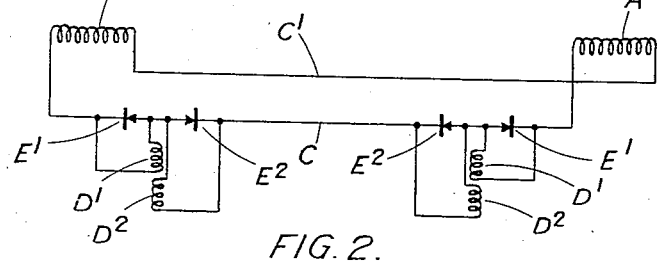
Figure 3:
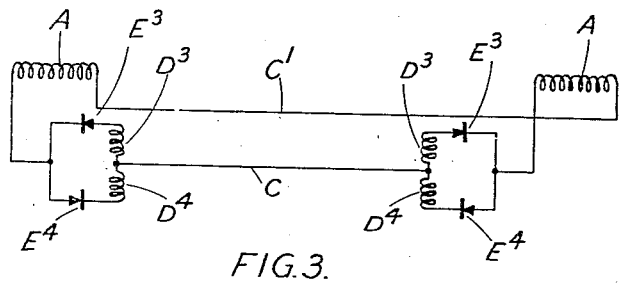

Figures 2 and 3 show modifications of the arrangement of Figure 1 in which both halves of the A. C. wave are utilized by employing a two-coil relay and two rectifiers at each end. In Figure 2 each relay coil $D^1$ or $D^2$ is shunted by a rectifier $E^1$ or $E^2$ and the two shunted coils of each relay are connected in series with one another in the pilot circuit C $C^1$. The two rectifiers $E^1$ $E^2$ are oppositely directed so that one half of the A. C. wave flows through the coil $D^1$ and the rectifier $E^2$ whilst the other half flows through the coil $D^2$ and the rectifier $E^1$. In Figure 3 the two coils $D^3$ $D^4$ of each relay are connected in parallel in the pilot circuit and each coil has in series with it a rectifier $E^3$ or $E^4$ so directed that the A. C. wave flows alternately through the two coils. The operation of these two modifications is similar to that of the arrangement of Figure 1 and will be clear without further description.

Figure 4:
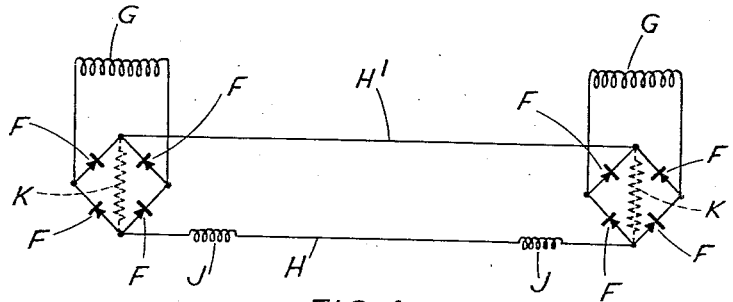
Figure 5:
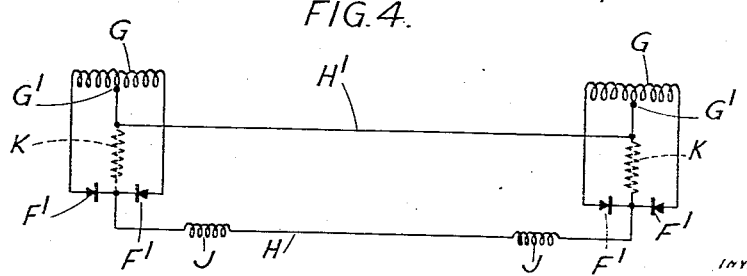

Figures 4 and 5 show two alternative arrangements in which the secondary E. M. F.'s of the current transformers at the ends of the protected section are rectified before being applied to the pilot circuit and the D. C. relays. In these arrangements the voltages and currents in the pilot circuit are unidirectional and it is therefore possible to minimize the difficulties referred to above under heading (b), (c) and (d)—in fact, bare pilot wire circuits on overhead lines may be made workable. It may also become possible to incorporate the pilot wires in the main cable itself instead of employing a separate pilot cable as has been necessary hitherto.

In the arrangement of Figure 4 four rectifiers F are provided at each end and are arranged in the wellknown Wheatstone bridge formation to give full-wave rectification, the two sides of the current transformer secondary G being connected to two opposite corners of the bridge whilst the other two corners are connected to the two pilot wires H $H^1$, one of which contains the D. C. relays J. The directions of the rectifiers are such that the rectified E. M. F.'s from the two ends of the pilot circuit are normally balanced against one another.

Another wellknown arrangement of the rectifiers for giving full-wave rectification is shown in Figure 5, in which two oppositely disposed rectifiers $F^1$ are connected in series with one another across the current transformer secondary G, the two pilot wires H $H^1$ being connected respectively to a midpoint tapping $G^1$ on the secondary and to the point of juncture of the two rectifiers $F^1$.

In both these arrangements no current normally flows in the pilot circuit, but when a fault occurs in the protected section the normal balance in the pilot circuit is disturbed and a current will flow around that circuit to operate the relays. A possible difficulty which might be anticipated with these arrangements is that if the tendency of this current were to flow in one direction around the pilot circuit the rectifiers at one end would prevent it passing, whereas if the tendency were to flow in the other direction the rectifiers at the other end would prevent it passing. This difficultay is partly met by the fact that most rectifiers would allow a certain amount of current to pass in the reverse direction. In other words, in one direction they have a very low resistance, whilst in the other direction the resistance, though high, is still finite. If the resistance of the rectifiers in the high resistance direction is not sufficiently low it is possible to obtain the desired result by shunting the rectifiers by an external resistance, indicated in dotted lines at K in Figures 4 and 5.

Figure 6:
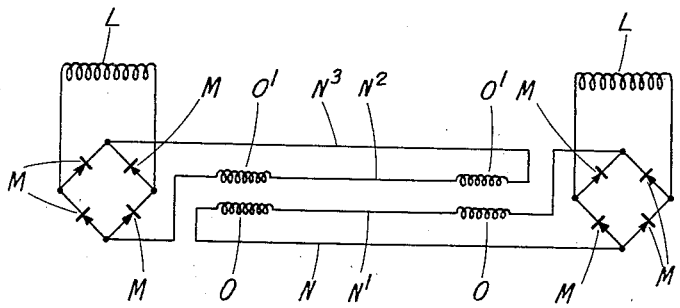

This difficulty is obviated in another alternative arrangement shown in Figure 6. In this arrangement the E. M. F.'s from each current transformer secondary L are rectified by a Wheatstone bridge arrangement of four rectifiers M (or alternatively by an arrangement of two rectifiers as shown in Figure 5) and are applied to two of the wires of a four-wire pilot circuit N $N^1$ $N^2$ $N^3$. The D. C. relays each have two coils O $O^1$, one in each pair of pilot wires. Thus each pair of pilot wires N $N^1$ or $N^2$ $N^3$ constitutes a separate circuit around which rectifier current from the current transformer secondary L at one end continuously circulates and the two currents are normally balanced against one another in the two coils O $O^1$ of each relay. A fault in the protected section disturbs the normal balance in each relay and thus causes the relays to operate.

Figure 7:
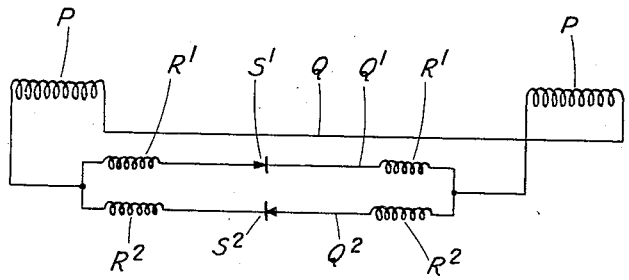

Figure 7 shows yet another method of avoiding the above mentioned difficulty. In this arrangement the secondary E. M. F.'s of the current transformers P are opposed to one another in the pilot circuit without rectification as in the arrangements of Figures 1 to 3. Three pilot wires Q $Q^1$ $Q^2$ are employed, of which one Q directly connects the secondaries P on one side, whilst the other two $Q^1$ $Q^2$ are in parallel with one another and connect the other sides of the two secondaries P. The D. C. relays each have two coils $R^1$ $R^2$ respectively connected in the two pilot wires $Q^1$ $Q^2$, each of which also contains a rectifier $S^1$ or $S^2$, the two rectifiers being oppositely directed so as to allow current to flow in one direction through the pilot wire $Q^1$ and the relay coils $R^1$ and in the reverse direction through the pilot wire $Q^2$ and the relay coils $R^2$.

In this arrangement normally no current flows in the pilot circuit, but when a fault occurs in the protected section, an alternating current will flow in the pilot wire Q. One half of the A. C. wave will flow through the pilot wire $Q^1$ and the other half will flow through the pilot wire $Q^2$, so that the two coils of each relay will be alternately energized.

Figure 8:
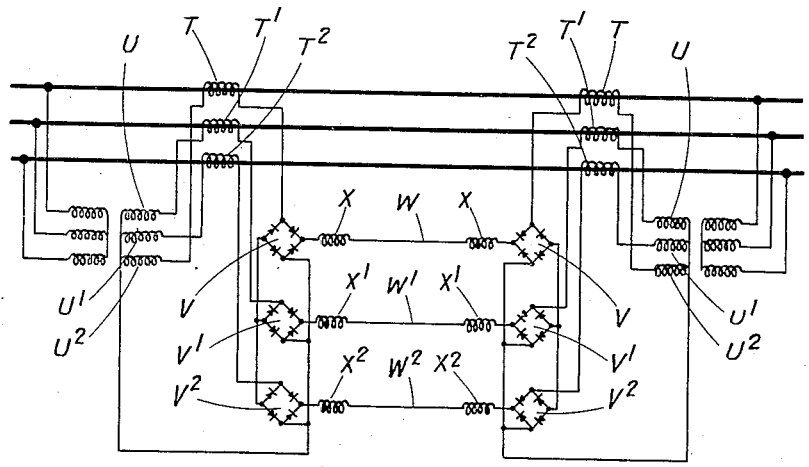

Another possible difficulty, which might arise with the arrangements of Figures 4 and 5, is that under certain conditions the fault currents at the two ends of the protected section might be equal in magnitude but 180° out of phase with one another. With the ordinary opposed E. M. F. balanced protective systems (as also with the arrangements of Figures 1, 2, 3 and 7) such a fault operates the protective gear because, although the r. m. s. values of the fault currents at the two ends are equal, they are 180° out of phase and therefore the voltages of the current transformer secondaries at the two ends, which are normally opposed to each other, become in phase with each other, so that there is a resultant voltage to circulate current in the pilot circuit and the relays. If, as in Figures 4 and 5, the current transformer secondary voltages are rectified, it is obvious that there can be no question of any resultant voltage under these particular fault conditions. One way of overcoming this difficulty in the case of a three-phase system is illustrated in Figure 8, wherein the secondary voltage of each current transformer T or $T^1$ or $T^2$ is combined with another voltage derived from a potential transformer secondary $U^2$ or U or $U^1$, the current transformer secondary being in series with the potential transformer secondary in the lagging phase.

A resultant voltage is thus obtained which is dependent partly on the magnitude and partly on the phase of the primary current, and this resultant voltage is rectified by means of groups of rectifiers V $V^1$ $V^2$ arranged in Wheatstone bridge formation and applied to the pilot wires W $W^1$ $W^2$ and the relays X $X^1$ $X^2$. With this arrangement normally no current flows in the pilot circuit but when a fault occurs in the protected section a rectified current will flow through the relays. If necessary, the rectifiers V $V^1$ $V^2$ may be shunted with a high resistance as described in connection with the arrangement of Figure 4.

The invention may also be applied in a similar manner to the Merz-Price circulating current system, in which the current transformer secondaries are connected in the same sense into the pilot circuit instead of in opposition, the tripping relays being connected between equipotential points in the pilot circut.

The employment of rectified current in the pilot circuit according to the invention has a further advantage in that it eliminates many of the practical difficulties attendant upon the application of a Merz-Price protective arrangement to the protection of a feeder having one or more branch feeders teed off at intermediate points. In such a case the rectified secondary E. M. F.'s from the three or more ends of the teed feeder system are applied to the pilot circuit in series with one another in such a manner that there is normally a balance of E. M. F.'s in that circuit.

The D. C. tripping relays in the pilot circuit may be of any suitable form but must have a time function sufficiently large to render their operation independent of the fluctuations arising from the use of rectified alternating current. This time function will also serve to render the relays immune from the effects of the rectified high frequency currents of short duration which might flow in the pilot circuit as the result of high frequency surges in the power circuit. The pilot circuit may also be compensated for the effects of capacity currents in one or other of the well-known ways, as for example, by the provision of open-circuited sheaths around the pilot wires.

The arrangement according to the invention also has the advantage that the pilot circuit can be utilized, without the provision of special devices, for the transmission of D. C. currents for emergency tripping purposes.

The rectifiers are preferably of the copper oxide film type, in view of their high degree of stability and uniformity of performance, but it will be appreciated that the invention is not limited to the employment of rectifiers of this type, and that thermionic valves, or rectifiers of the electrolytic or other types may also be employed.

What I claim as my invention and desire to secure by Letters Patent is:—

1. In an electric protective arrangement for an A. C. power circuit, the combination of current transformers at the ends of the protected circuit, a pilot circuit energized from the secondaries of such transformers, D. C. relays in the pilot circuit, and rectifiers so connected to the pilot circuit as to render the D. C. relays operative to cut out the protected circuit on the occurrence of a fault therein.

2. In an electric protective arrangement for an A. C. power circuit, the combination of current transformers at the ends of the protected circuit, a pilot circuit energized from the secondaries of such transformers, D. C. relays in the pilot circuit, and rectifiers so connected in the pilot circuit as to cause unidirectional currents to flow through the relays when alternating currents are flowing in the pilot circuit, the arrangement being such that the D. C. relays will be operative to cut out the protected circuit on the occurrence of a fault therein.

3. In an electric protective arrangement for an A. C. power circuit, the combination of current transformers at the ends of the protected circuit, a pilot circuit energized from the secondaries of such transformers, D. C. relays in the pilot circuit, and a rectifier so connected to each D. C. relay operating coil that one half of the A. C. wave flowing in the pilot circuit will pass without going through the coil whilst the other half is forced through the coil, the arrangement being such that the D. C. relays will be operative to cut out the protected circuit on the occurrence of a fault therein.

4. In an electric protective arrangement for an A. C. power circuit, the combination of current transformers at the ends of the protected circuit, a pilot circuit energized from the secondaries of such transformers, D. C. relays in the pilot circuit each having two operating coils, and a rectifier associated with each relay coil whereby one half of the A. C. wave flowing in the pilot circuit will pass through one coil of each relay whilst the other half passes through the other relay coil, the arrangement being such that the D. C. relays will be operative to cut out the protected circuit on the occurrence of a fault therein.

5. In an electric protective arrangement for an A. C. power circuit, the combination of current transformers at the ends of the protected circuit, a pilot circuit energized from the secondaries of such transformers, D. C. relays in the pilot circuit each having two operating coils connected in parallel with one another, and a rectifier so connected in series with each relay coil that one half of the A. C. wave flowing in the pilot circuit will pass through one coil of each relay whilst the other half passes through the other relay coil, the arrangement being such that the D. C. relays will be operative to cut out the protected circuit on the occurrence of a fault therein.

6. In an electric protective arrangement for an A. C. power circuit, the combination of current transformers at the ends of the protected circuit, a pilot circuit energized from the secondaries of such transformers, D. C. relays in the pilot circuit, and rectifiers associated with the current transformers and acting to convert the secondary E. M. F.'s thereof into unidirectional E. M. F.'s which are applied to the pilot circuit and the relays, the arrangement being such that the D. C. relays will be operative to cut out the protected circuit on the occurrence of a fault therein.

7. In an electric protective arrangement for an A. C. power circuit, the combination of current transformers at the ends of the protected circuit, a pilot circuit energized from the secondaries of such transformers, D. C. relays in the pilot circuit, and rectifiers arranged to give full-wave rectification and connected between the current transformer secondaries and the pilot circuit whereby unidirectional E. M. F.'s are applied to the pilot circuit and the relays, the arrangement being such that the D. C. relays will be operative to cut out the protected circuit on the occurrence of a fault therein.

8. In an electric protective arrangement for an A. C. power circuit, the combination of current transformers at the ends of the protected circuit, a pilot circuit energized from the secondaries of such transformers, D. C. relays in the pilot circuit, each relay having two operating coils, and rectifiers so connected to the pilot circuit that each relay coil receives unidirectional currents derived from the current transformer secondary E. M. F.'s. the arrangement being such that the D. C. relays will be operative to cut out the protected circuit on the occurrence of a fault therein.

9. In an electric protective arrangement for an A. C. power circuit, the combination of current transformers at the ends of the protected circuit, potential transformers at the ends of the protected circuit having their secondaries connected to the current transformer secondaries, a pilot circuit energized from each end in accordance with the resultant E. M. F. from the current and potential transformer secondaries, rectifiers at each end disposed between the pilot circuit and the transformer secondaries whereby a unidirectional E. M. F. is applied to the pilot circuit dependent both on the magnitude and on the phase of the primary current flowing in the protected circuit at that end, and D. C. relays in the pilot circuit so arranged as to be operative to cut out the protected circuit on the occurrence of a fault therein.

10. In an electric protective arrangement for an A. C. power circuit, the combination of current transformers at the ends of the protected circuit, a pilot circuit energized from the secondaries of such transformers and comprising three pilot wires two of which are connected in parallel with one another, a D. C. relay at each end of the pilot circuit having two operating coils respectively connected in series with the two parallel-connected pilot wires, and two oppositely-directed rectifiers one in each of the two parallel-connected pilot wires whereby unidirectional currents can flow in one direction through one coil of each relay and in the opposite direction through the other coil, the arrangement being such that the D. C. relays will be operative to cut out the protected circuit on the occurrence of a fault therein.

11. In an electric protective arrangement for an A. C. power circuit, the combination with the features claimed in claim 6, of resistances shunted across the rectifiers and acting to allow current of sufficient magnitude to operate the relays to flow through the pilot circuit on the occurrence of a fault in the protected circuit.

12. In an electric protective arrangement for an A. C. power circuit, the combination with the features claimed in claim 7, of resistances shunted across the rectifiers and acting to allow current of sufficient magnitude to operate the relays to flow through the pilot circuit on the occurrence of a fault in the protected circuit.

13. In an electric protective arrangement for an A. C. power circuit, the combination of current transformers at the ends of the protected circuit, potential transformers at the ends of the protected circuit having their secondaries connected to the current transformer secondaries, a pilot circuit energized from each end in accordance with the resultant E. M. F. from the current and potential transformer secondaries, rectifiers arranged to give full-wave rectification disposed at each end between the pilot circuit and the transformer secondaries whereby a unidirectional E. M. F. is applied to the pilot circuit dependent both on the magnitude and on the phase of the primary current flowing in the protected circuit at that end, D. C. tripping relays so connected in the pilot circuit as to be normally inoperative, and resistances shunted across the rectifiers and acting to allow current of sufficient magnitude to operate the relays to flow through the pilot circuit on the occurrence of a fault in the protected circuit.

In testimony whereof I have signed my name to this specification.

JAMES ROBERT BEARD.